Figures 1, 2:
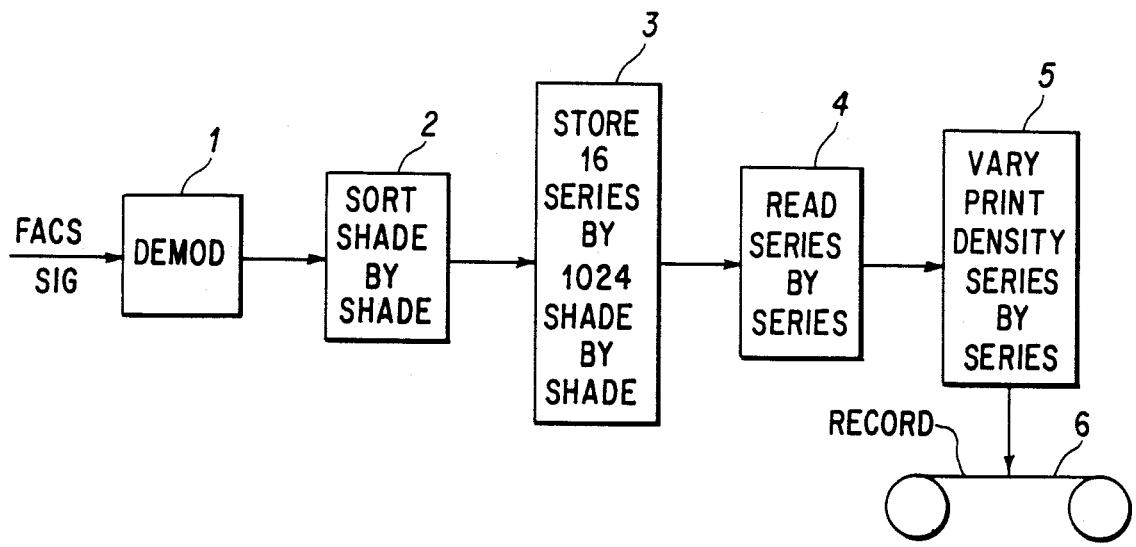

United States Patent [19]

Nowell

[11] Patent Number: 4,821,111
[45] Date of Patent: Apr. 11, 1989

[54] METHOD OF RECORDING FACSIMILE SIGNALS

[75] Inventor: Scott Nowell, Brookline, N.H.

[73] Assignee: Alden Research Foundation, Brockton, Mass.

[21] Appl. No.: 146,980

[22] Filed: Jan. 22, 1988

[51] Int. Cl.⁴ .......................... H04N 1/21; H04N 1/23
[52] U.S. Cl. .................................... 358/296; 358/283; 346/76 PH
[58] Field of Search ............... 358/296, 298, 283, 300, 358/302; 346/153.1, 76 PH

[56] References Cited

U.S. PATENT DOCUMENTS

| | | | |
|---|---|---|---|
| 3,604,846 | 9/1971 | Behane | 358/298 |
| 4,257,071 | 3/1981 | Lamb | 346/153.1 |
| 4,516,135 | 5/1985 | Todoh | 358/248 |
| 4,532,523 | 7/1985 | Tanaka | 358/298 |

Primary Examiner—E. A. Goldberg
Assistant Examiner—L. Donovan
Attorney, Agent, or Firm—James H. Grover

[57] ABSTRACT

A method of recording the varying gray shades of a facsimile signal line by line with a thermal print head having a linear arrary of heating elements sorts out the individual pixels of a facsimile signal line according to their gray shade in a scale of 1 to 16, and to their line position, into a number of separate series of pixels, each series representing a different gray shade. The 16 different series are stored and read out of a memory in their separate series, and as the separate series are applied to a thermal print head the marking energy is varied 16 times from series to series corresponding to the gray scale of the original signal. Thus 16 successive series of pixels are marked on the same line of a thermosensitive paper to reproduce all the gray shades.

6 Claims, 1 Drawing Sheet

```
POSITION   1 2 3 4 5 6 7 8 9 . . . . . . . . 1024
   LINE 1  0 0 0 0 0 0 0 0 0 0 . . .
        2  0 0 0 0 0 0 0 0 X 0
        3  0 0 0 X 0 0 0 0 X .
        4  0 0 0 0 X 0 0 0
        5  0 X 0 X 0 0 0 . .
        6  0 0 X 0 . .
        .
        .
       16  0 0 . .
```

METHOD OF RECORDING FACSIMILE SIGNALS

BACKGROUND OF THE INVENTION

Facsimile signals of graphic material such as weather maps are now being printed with a thermal printing head having a linear array of, for example, 1024 minute thermal printing elements extending across the heat sensitive paper on which it will mark a line of picture elements. Such elements are called pixels, a term also identifying the elements of the original graphic matter and the corresponding electrical elements of the facsimile signal. As the paper is fed past the head it marks the paper line by line, each line comprising a series of dots at positions along the line, or the absence thereof. A printing element which receives marking current will mark a black pixel; other elements receiving no current will make no mark and leave the paper white.

While a recording having only black and white pixels is useful for many kinds of graphic material, it is often highly desirable to print pixels of gray tones or densities between black and white. It is, however, very difficult if not impossssible to supply different values of marking current to different printing elements at the same time, and thermal heads have not been used successfully hitherto for making recordings with a scale of gray tones from white to black.

Accordingly it is the object of the present to provide a method of recording facsimile recordings with a thermal print head and having a nearly continuous tone shading from black to white.

SUMMARY OF THE INVENTION

According to the invention a method of recording facsimile signals of different shades with a printing head marking individual pixels along a line comprises sorting out the signal pixels of a line according to shade and position along each line, storing the pixels of the line of the same shade according to their positions on the line and in separate series, successively and separately reading out of storage the series of pixels of different shades, and separately marking all pixels of each series of one shade with the same density on a record, each line being recorded by a plurality of markings of different densities, so as to produce a recording with the different shades of the facsimile signal.

DRAWINGS

FIG. 1 is a flow diagram of a method of recording facsimile signals according to the invention; and FIG. 2 is a diagram illustrating the storage of lines of pixels in the method of FIG. 1.

DESCRIPTION

As shown in FIG. 1, facsimile signals are demodulated from their AM OR FM carrier (1 DEMOD) converting them into series of analog or digital signals representing successive transverse lines of the original graphic material such as a weather map line by line and pixel by pixel. Where the signal pixels represent neither black nor white they may be some gray shade or density on the scale between black and white. One conventional gray scale has 16 different density values including black, white and increasingly lighter gray densities between. With prior methods of recording the signals on a thermal printing head, the gray shades of the scale are lost and only black is marked on the recording paper.

The first step of the present recording method is to analyse each line of signals pixel by pixel and sort out all the pixels of the same gray shade into a series of pixel signals having their original position in that signal line. (FIG. 1, 2 SORT SHADE BY SHADE) This sorting is repeated as many times, e.g., 16, as there are gray shades in the demodulated signal so that a plurality of series of pixels will be sorted out, each series containing all the pixels in a signal line of the same shade, each pixel being in the same position in its series as it was in the original signal.

FIG. 2 illustrates how the pixels of an individual line are sorted out to make up 16 separate lines or series of pixels, each series containing the same number of pixel positions, e.g., 1024, as the thermal print head has marking elements. In FIG. 2 a "O" represents a white or zero value pixel, and an "X" represents a black or gray pixel value. The actual shade of black or gray is designated by the line into which the pixel is sorted. The pixels of Line 1 all represent white. In Line 2, the X pixel represents a very light shade, while the pixels in lines 2 to 15 represent increasingly darker gray shades, Line 16 representing black.

The respective series of sorted pixels are stored separately shade by shade in a conventional memory by microprocessing. That is, each series containing pixels of the same gray shade are stored discretely in the memory (3 STORE 16 SERIES BY 1024 SHADE BY SHADE).

The stored pixel series representing different shades are then successively and separately read out of storage (4 READ SERIES BY SERIES), and applied to a moving, heat sensitive record such as thermal recording paper. All the pixel series, e.g., 16, of one signal line are marked on the same line of the recording paper transversely of its movement in superposition, that is, with the series of each shade linearly interspersed with the other shade series.

During marking, however, the printing density is varied between readout of successive shade lines of pixel series so that each separate series of pixels is recorded with a different marking density. Variation of the density is effected by increasing the energy of the marking current, preferably by increasing the time (by microseconds) that the marking current is applied to the thermal print during marking of each different shade series. Variation of marking energy occurs at the rate of readout of the 16 series, not at the pixel rate. The total time for printing one 1024 pixel line of 16 series is approximately 15 miliseconds so that there is no significant delay attributable to the 16 successive markings for one elemental picture line which produce a graphic recording with almost continuous shades of gray.

It should be understood that the foregoing description is for the purpose of illustration only, and that the invention includes all modifications and equivalents falling within the accompanying claims.

I claim:

1. The method of recording facsimile signals of different shades, line by line with a printing head marking individual pixels along each line, comprising:
   sorting out the signal pixels of each line according to shade and position along each line;
   storing pixels of each line of the same shade in separate series according to their positions on the line;
   successively and separately reading out of storage the respective series of pixels of different shades; and separately marking all pixels of each series of one shade with the same density on the record, each line being recorded by a plurality of markings of different densities, so as to produce a recording with the different shades of the facsimile signal.

2. The method according to claim 1 including the step of applying marking current to a thermal print head.

3. The method of claim 1 including the step of generating marking currents of increasing energy for respective pixel series representing darker shades.

4. The method of claim 2 including the step of generating marking currents of increasing energy for pixel series respectively representing darker shades.

5. The method of claim 3 wherein the duration of marking each pixel is increased from series to series.

6. The method according to claim 1 wherein the recording density is varied at the readout rate of the separately stored plurality of pixel series.

* * * * *